US010400139B2

(12) United States Patent
Onishi et al.

(10) Patent No.: US 10,400,139 B2
(45) Date of Patent: Sep. 3, 2019

(54) LOW-TEMPERATURE-CURABLE COATING COMPOSITION

(71) Applicant: NIPPON PAINT HOLDINGS CO., LTD., Osaka (JP)

(72) Inventors: Isamu Onishi, Osaka (JP); Akihiro Kubo, Tokyo (JP); Yukiko Toyota, Tokyo (JP); Yoshinori Kushi, Hirakata (JP)

(73) Assignee: NIPPON PAINT HOLDINGS CO., LTD., Osaka (JP)

( * ) Notice: Subject to any disclaimer, the term of this patent is extended or adjusted under 35 U.S.C. 154(b) by 0 days.

(21) Appl. No.: 15/757,472

(22) PCT Filed: Aug. 19, 2016

(86) PCT No.: PCT/JP2016/074177

§ 371 (c)(1), (2) Date: Mar. 5, 2018

(87) PCT Pub. No.: WO2017/038488

PCT Pub. Date: Mar. 9, 2017

(65) Prior Publication Data

US 2018/0258318 A1 Sep. 13, 2018

(30) Foreign Application Priority Data

Sep. 4, 2015 (JP) ................................ 2015-174825

(51) Int. Cl.

| | |
|---|---|
| ***C09D 201/02*** | (2006.01) |
| ***C09D 201/06*** | (2006.01) |
| ***C09D 201/08*** | (2006.01) |
| ***C09D 101/02*** | (2006.01) |
| ***C08L 101/02*** | (2006.01) |
| ***C09D 7/20*** | (2018.01) |

(52) U.S. Cl.

CPC ........ *C09D 201/025* (2013.01); *C08L 101/02* (2013.01); *C09D 7/20* (2018.01); *C09D 201/02* (2013.01); *C09D 201/06* (2013.01); *C09D 201/08* (2013.01)

(58) Field of Classification Search

CPC .... C09D 201/025; C09D 7/20; C09D 201/02; C09D 201/06; C09D 201/08; C08L 101/02

USPC .......................................................... 524/516

See application file for complete search history.

(56) References Cited

U.S. PATENT DOCUMENTS

| | | | | |
|---|---|---|---|---|
| 5,424,369 A * | 6/1995 | Yukawa | ............. | C08G 18/0814 525/286 |
| 6,406,757 B1 | 6/2002 | Blatter et al. | | |
| 2014/0295149 A1* | 10/2014 | Ito | ......................... | C07C 69/708 428/195.1 |

FOREIGN PATENT DOCUMENTS

| | | |
|---|---|---|
| EP | 0 620 256 | 10/1994 |
| JP | 5-178959 | 7/1993 |
| JP | 5-186720 | 7/1993 |
| JP | 6-322292 | 11/1994 |
| JP | 2002-53799 | 2/2002 |
| JP | 2002-503747 | 2/2002 |
| JP | 2011-94102 | 5/2011 |
| JP | 2013-133445 | 7/2013 |
| JP | 5762435 | 8/2015 |
| WO | 2012/060390 | 5/2012 |
| WO | 2013/089204 | 6/2013 |

OTHER PUBLICATIONS

International Search Report dated Nov. 15, 2016 in International Application No. PCT/JP2016/074177.
International Preliminary Report on Patentability dated Mar. 15, 2018 in International Application No. PCT/JP2016/074177.

* cited by examiner

*Primary Examiner* — Kelechi C Egwim
(74) *Attorney, Agent, or Firm* — Wenderoth, Lind & Ponack, L.L.P.

(57) ABSTRACT

The present invention provides a coating composition which cures at low temperatures to form a cured film having high solvent resistance. The present invention provides a low-temperature-curable coating composition which comprises (A) a film-forming polymer having a hydrogen-donating functional group that has a heteroatom which bonds covalently to a hydrogen atom, (B) a film-forming polymer having a specific hydrogen-accepting functional group that has a heteroatom to which no hydrogen atom bonds covalently, and (C) a non-basic volatile solvent selected from the group consisting of a non-basic volatile solvent (C-1) having, in the molecule, both a heteroatom that bonds covalently to a hydrogen atom and a heteroatom that does not bond covalently to a hydrogen atom; a mixture of a non-basic volatile solvent (C-2) having, in the molecule, a heteroatom which bonds covalently to a hydrogen atom and a non-basic volatile solvent (C-3) having, in the molecule, a heteroatom to which no hydrogen atom bonds covalently; and combinations thereof.

20 Claims, No Drawings

LOW-TEMPERATURE-CURABLE COATING COMPOSITION

TECHNICAL FIELD

The present invention provides a low-temperature-curable coating composition, particularly, a low-temperature-curable coating composition which cures at low temperatures (specifically, 15° C. to 100° C.) to form a solvent-resistant cured film.

BACKGROUND ART

Paint is coated on many products for improving appearance of articles. For products such as an automobile, thermosetting paints are used which cure at high temperatures of 140° C. to 250° C. for 20 minutes to 1 hour. The paints contain an isocyanate curing agent or a melamine curing agent, which is reacted with a resin included in the paints to form a cured film. However, since a high curing temperature and a long curing time needs the energy, a method of curing at a curing temperature of 100° C. to 130° C. for 20 to 40 minutes has recently been used, in view of resource saving and greenhouse gas regulation.

A curing temperature is desired to be lowered more. Film formation is required that the paint cures at such a temperature that the paint can be coated on plastic materials, for example, a temperature of 15 to 100° C., to form a cured film having high solvent resistance.

JP-A-2002-53799 (Patent Document 1) has proposed a paint for a golf ball, in which a two-pack curable urethane paint incorporating a polyol and a polyisocyanate, a curing catalyst, and a substance which forms a hydrogen bond with a hydroxy group of a polyol and volatilizes at 70° C. or lower are blended. This paint cures at low temperatures of 70° C. or lower, but needs curing for a long time (120 minutes in Example), a curing reaction is a urethane reaction, and a hydrogen bond is only used in a temporary reaction of a substance which volatilizes.

JP-T-2002-503747 (Patent Document 2) describes a method of forming powder finishing on a surface of a metal or a non-metal, in which a powder paint composition containing a resin which can be crosslinked with a functional group capable of generating a hydrogen bond (specifically, OH, COOH, $NH_2$, NHR or SH) is applied to a substrate, and this is melted and cured by NIR (near infrared rays) irradiation. In Examples, this paint cures in a short time by irradiating near infrared rays when a polyester having a carboxy group is cured with a curing agent such as an epoxy curing agent, and it is considered that the hydrogen bond is not utilized for curing.

JP-A-6-322292 (Patent Document 3) discloses a polymer composition for hydrophilization treatment, containing a polymer (a) which is obtained by polymerizing 50 mol % or more of an unsaturated monomer having a carboxylic acid group, a polymer (b) which has a proton-accepting structural unit interacting with a carboxylic acid group with a hydrogen bonding force, and can form a polymer complex due to a hydrogen bond with the polymer (a), and a volatile base. The volatile base neutralization-reacts with a carboxylic acid group of the polymer (a) to inhibit a reaction of a polymer complex, and has volatility, and an organic amine is exemplified. In this composition, a curing temperature is 180° C. for 10 minutes in Example of Patent Document 3, and this is not low temperature curing. Additionally, the volatile base easily remains in a coated film, and becomes the cause for a coated film defect such as deteriorated water resistance, in some cases, due to possession of relatively strong interaction with carboxylic acid. Furthermore, this reaction adversely influences the environment when the volatile base has finally volatilized, in addition to limitation of utility to an aqueous system in which a neutralization reaction product can be dissolved.

CITATION LIST

Patent Literature

Patent Literature 1: JP 2002-53799 A
Patent Literature 2: JP 2002-503747 A
Patent Literature 3: JP H06-322292 A

SUMMARY OF INVENTION

Technical Problem

The present inventors intensively studied a coating composition which cures at low temperatures to form a cured film having high solvent resistance, and as a result, found out that a coated film formed by using a hydrogen bond achieves low temperature curing and high solvent resistance, resulting in completion of the present invention.

Solution to Problem

That is, the present invention provides a low-temperature-curable coating composition which comprises:

(A) a film-forming polymer having a hydrogen-donating functional group that has a heteroatom which bonds covalently to a hydrogen atom, (B) a film-forming polymer having a hydrogen-accepting functional group that has a heteroatom to which no hydrogen atom bonds covalently, wherein the hydrogen-accepting functional group may or may not have a ring structure, when the hydrogen-accepting functional group has a ring structure, the heteroatom is a nitrogen atom, an oxygen atom and/or a sulfur atom, and when the hydrogen-accepting functional group has no ring structure, the heteroatom consists of only a nitrogen atom, or both of a nitrogen atom and an oxygen atom, and (C) a non-basic volatile solvent selected from the group consisting of a non-basic volatile solvent (C-1) having, in the molecule, both a heteroatom that bonds covalently to a hydrogen atom and a heteroatom that does not bond covalently to a hydrogen atom; a mixture of a non-basic volatile solvent (C-2) having, in the molecule, a heteroatom which bonds covalently to a hydrogen atom and a non-basic volatile solvent (C-3) having, in the molecule, a heteroatom to which no hydrogen atom bonds covalently; and combinations thereof.

The present invention also provides a low-temperature-curable coating composition, containing:

(D) a film-forming polymer having both a hydrogen-donating functional group that has a heteroatom which bonds covalently to a hydrogen atom and a hydrogen-accepting functional group that has a heteroatom to which no hydrogen atom bonds covalently, wherein the hydrogen-accepting functional group may or may not have a ring structure, when the hydrogen-accepting functional group has a ring structure, the heteroatom is a nitrogen atom, an oxygen atom and/or a sulfur atom, and when the hydrogen-accepting functional group has no ring structure, the heteroatom consists of only a nitrogen atom, or both of a nitrogen atom and an oxygen atom, and (C) a non-basic volatile solvent selected from the group consisting of a non-basic volatile solvent (C-1) having, in the molecule, both a heteroatom that bonds covalently to a hydrogen atom and a heteroatom that does not bond covalently to a hydrogen atom; a mixture of a non-basic volatile solvent (C-2) having, in the molecule, a heteroatom which bonds covalently to a hydrogen atom and a non-basic volatile solvent (C-3) having, in the molecule, a heteroatom to which no hydrogen atom bonds covalently; and combinations thereof.

The present invention provides a low-temperature-curable coating composition, in which (A) a film-forming polymer having a hydrogen-donating functional group that has a heteroatom which bonds covalently to a hydrogen atom, or (B) a film-forming polymer having a hydrogen-accepting functional group that has a heteroatom to which no hydrogen atom bonds covalently, wherein the hydrogen-accepting functional group may or may not have a ring structure, when the hydrogen-accepting functional group has a ring structure, the heteroatom is a nitrogen atom, an oxygen atom and/or a sulfur atom, and when the hydrogen-accepting functional group has no ring structure, the heteroatom consists of only a nitrogen atom, or both of a nitrogen atom and an oxygen atom, is further blended into the above mentioned low-temperature curable coating composition of the component (D) and the component (C).

It is preferable that the hydrogen-donating functional group is a group having an oxygen atom which bonds covalently to a hydrogen atom.

It is preferable that the hydrogen-donating functional group is a carboxy group and/or a hydroxy group.

It is preferable that the hydrogen-accepting functional group has a ring structure, and is selected from the group consisting of an N-substituted lactam group, a cyclic iminoether group, a cyclic imine group, an N-substituted hydrogenated cyclic iminoether group, a cyclic ether group, an N-substituted cyclic imide group, and a combination thereof.

It is preferable that the hydrogen-accepting functional group is an N-substituted lactam group and/or a cyclic imine group.

It is preferable that the hydrogen-accepting functional group has no ring structure, and is an N-substituted non-cyclic imide group and/or a non-cyclic tertiary amide group.

It is preferable that the non-basic volatile solvent (C-1) is a low molecular weight ether alcohol having an ether group and a hydroxy group.

The non-basic volatile solvent (C-2) is preferably a low molecular weight alcohol, and the non-basic volatile solvent (C-3) is preferably a low molecular weight ether.

It is preferable that the film-forming polymer (D) is a polymer having a carboxy group and/or a hydroxy group, and an N-substituted lactam group and/or a cyclic imine group.

Advantageous Effects of Invention

Since the low-temperature-curable coating composition of the present invention cures using a hydrogen bond, it cures at low curing temperatures, particularly, a temperature of 15 to 100° C., and a film obtained by it becomes to have high solvent resistance.

Why when a hydrogen bond is used, a highly solvent-resistant film is formed even at low curing temperatures has not sufficiently been elucidated yet, but the present inventors think as follows: A hydrogen bond refers to a bond which is made by a hydrogen atom which bonds covalently to a heteroatom, particularly a heteroatom having a high electronegativity such as an oxygen atom, a nitrogen atom, and a sulfur atom, with an unshared electron pair of another functional group in the vicinity. The strength thereof is between 10 to 40 kJ/mol, which is stronger than the van der Waals force (around 1 kJ/mol), but which is weaker than a covalent bond (around 150 to 500 kJ/mol), and reversible bonding and dissociation are possible at room temperature. Accordingly, a hydrogen bond is very weak bond as compared with a covalent bond, and it has been considered that a hydrogen bond is unsuitable and cannot be used for a curing reaction of a film-forming resin of the paint or the like. A hydrogen bond itself is a weak bond, however, it is considered that when many hydrogen bonds are formed between polymers having many functional groups forming a hydrogen bond, they become a very powerful bonding force, and high solvent resistance can be achieved. Additionally, when considered in terms of the Gibbs energy ($\Delta G$), it can also be understood that $\Delta G = \Delta H - T\Delta S$ (wherein, H is enthalpy, T is temperature, and S is entropy), and a hydrogen bond has reversibility, accordingly, each hydrogen-donating functional group has a degree of freedom of a bound state combination by which the crosslinked state can be retained as a whole hydrogen bond network while changing a bonding partner with other plural hydrogen-accepting functional groups, a factor of the energy of an entropy item ($-T\Delta S$) becomes great, and the great energy becomes necessary in order to cut a bond. Furthermore, it is considered that it becomes possible to form a substantially strong crosslinked network also in terms of a kinetic bonding factor described next, in addition to the above-mentioned so-called thermodynamic bonding factor. That is, in order to lead to cutting of a crosslinked network due to a hydrogen bond having reversibility, it is necessary that all of hydrogen bonds contained in one polymer chain are cut simultaneously, and they are eliminated from a hydrogen bond network while always retaining the state where no hydrogen bond is formed even when the polymer chain approaches a hydrogen bonding functional group of another polymer chain. However, it is considered that when a hydrogen bonding polymer is appropriately selected, a probability that such phenomenon occurs can be extremely small, and it becomes possible to form a substantially strong crosslinked network.

And, when a hydrogen bond is used in a curing reaction, the presence of the non-basic volatile solvent of the component (C) of the present invention is important. In the state such as the paint, this solvent caps functional groups having the ability to form a hydrogen bond, of individual polymers, to temporarily suppress a crosslinking reaction. Since this solvent has a high vapor pressure, at the time of film formation, even at low curing temperatures (e.g. temperature of about 60° C.), this solvent is evaporated into the air and a functional group of a polymer which has been released from restriction of a hydrogen bond by the solvent regains the ability to form a hydrogen bond with another polymer, and then a hydrogen bond between polymers is formed, and a firm film due to many hydrogen bonds is formed as described above.

DESCRIPTION OF EMBODIMENTS

A first composition of the present invention is a low-temperature-curable coating composition which comprises:

(A) a film-forming polymer having a hydrogen-donating functional group that has a heteroatom which bonds covalently to a hydrogen atom, (B) a film-forming polymer having a hydrogen-accepting functional group that has a heteroatom to which no hydrogen atom bonds covalently, wherein the hydrogen-accepting functional group may or may not have a ring structure, when the hydrogen-accepting functional group has a ring structure, the heteroatom is a nitrogen atom, an oxygen atom and/or a sulfur atom, and when the hydrogen-accepting functional group has no ring structure, the heteroatom consists of only a nitrogen atom, or both of a nitrogen atom and an oxygen atom, and (C) a non-basic volatile solvent selected from the group consisting of a non-basic volatile solvent (C-1) having, in the molecule, both a heteroatom that bonds covalently to a hydrogen atom and a heteroatom that does not bond covalently to a hydrogen atom; a mixture of a non-basic volatile solvent (C-2) having, in the molecule, a heteroatom which bonds covalently to a hydrogen atom and a non-basic volatile solvent (C-3) having, in the molecule, a heteroatom to which no hydrogen atom bonds covalently; and combinations thereof.

Component (A)

A component (A) of the low-temperature-curable coating composition of the present invention is a film-forming polymer having a hydrogen-donating functional group that has a heteroatom which bonds covalently to a hydrogen atom. The heteroatom is an atom having high electronegativity such as an oxygen atom (O), a nitrogen atom (N), and a sulfur atom (S) as stated in the above-mentioned illustration of a hydrogen bond, a group having a hydrogen atom that bonds covalently to it is a hydrogen-donating functional group, and examples thereof include specifically a carboxy group (—COOH), a hydroxy group (—OH), an amino group (—NHR or —$NH_2$; wherein R is an alkyl group or an aryl group) or a thiol group (—SH). The hydrogen-donating functional group is preferably a group having an oxygen atom which bonds covalently to hydrogen, and is specifically a carboxy group or a hydroxy group, and more preferably a carboxy group.

The component (A) of the present invention is a polymer having the hydrogen-donating functional group as described above, and is obtained by polymerizing an unsaturated monomer having a hydrogen-donating functional group, or copolymerizing an unsaturated monomer having a hydrogen-donating functional group, and another copolymerizable monomer.

Examples of the unsaturated monomer having a carboxy group include acrylic acid, methacrylic acid, itaconic acid, crotonic acid, 2-acryloyloxyethylphthalic acid, 2-acryloyloxyethylsuccnic acid, co-carboxy-polycaprolactone mono (meth)acrylate, isocrotonic acid, fumaric acid or maleic acid. In addition, in the present description, “(meth)acrylate” means acrylate or methacrylate.

Examples of the unsaturated monomer having a hydroxy group include 2-hydroxyethyl (meth)acrylate, 3-hydroxypropyl (meth)acrylate, or 4-hydroxybutyl (meth)acrylate, allyl alcohol, methallyl alcohol, 2-hydroxy-3-phenoxypropyl (meth)acrylate, pentaerythritol mono(meth)acrylate, glycerol mono(meth)acrylate, and adducts of these and ε-caprolactone, and the like.

Examples of the unsaturated monomer having an amino group include amino styrene, vinylbenzylamine, vinylethylamine, N-isopropyl-2-(4-vinylphenyl)ethylamine, and the like.

Examples of the unsaturated monomer having a thiol group include 2-sulfanylethyl (meth)acrylate, 3-sulfanylpropyl (meth)acrylate, or 4-sulfanylbutyl (meth)acrylate, 2-vinylbenzenethiol, and the like.

As an example of the monomer which is copolymerized with the unsaturated monomer having the hydrogen-donating functional group as described above, monomers such as (meth)acrylic acid alkyl ester and styrene can be used.

This copolymerization reaction may be aqueous solution polymerization, suspension polymerization, and emulsion polymerization, using water as a medium, or solution polymerization or precipitation polymerization using an organic solvent, or mass polymerization. Additionally, the copolymerization reaction may be performed by conducting polymerization using a solution as a medium (solution polymerization or precipitation polymerization etc.) or mass polymerization, thereafter, if necessary, conducting desolvation in the case of solution polymerization, and conducting dissolution or emulsification in water, if necessary, using an emulsifying agent or a neutralization agent. Furthermore, a method of conducting polymerization using water as a medium (aqueous solution polymerization, emulsion polymerization, suspension polymerization etc.), thereafter, if necessary, conducting dehydration, and conducting dissolution in a solvent, or dispersion in a solvent, if necessary, using an emulsifying agent. A molecular weight of the film-forming polymer (A) is usually 1,000 to 2,000,000, preferably 2,000 to 1,500,000, and more preferably 3,000 to 1,000,000 as expressed by a number average molecular weight. When a number average molecular weight is smaller than 1,000, improvement in solvent resistance becomes not to be sufficiently obtained, and when a number average molecular weight is greater than 2,000,000, the viscosity becomes extremely great, and preparation or coating of the paint becomes difficult.

Component (B)

A component (B) of the low-temperature-curable coating composition of the present invention is a film-forming polymer having a hydrogen-accepting functional group that has a heteroatom to which no hydrogen atom bonds covalently, in which the hydrogen-accepting functional group may or may not have a ring structure, when the hydrogen-accepting functional group has a ring structure, the heteroatom is a nitrogen atom, an oxygen atom and/or a sulfur atom, and when the hydrogen-accepting functional group has no ring structure, the heteroatom consists of only a nitrogen atom, or both of a nitrogen atom and an oxygen atom. As described above, the heteroatom is an atom having high electronegativity, such as an oxygen atom (O), a nitrogen atom (N), and a sulfur atom (S), when the hydrogen-accepting functional group has a ring structure, the heteroatom may be an oxygen atom, a nitrogen atom and/or a sulfur atom, and when the hydrogen-accepting functional group has no ring structure, the heteroatom has only a nitrogen atom, or both of a nitrogen atom and an oxygen atom, as stated in the above-mentioned hydrogen bond. It is considered that when the hydrogen-accepting functional group has a ring structure, a strain which is generated by formation of a ring can maintain hydrogen acceptability high in the case of any heteroatom, but when the hydrogen-accepting functional group has no ring structure, hydrogen acceptability can be maintained high, in the case where there is only a nitrogen atom, or there are both of a nitrogen atom and an oxygen atom.

The hydrogen-accepting functional group of the component (B), when it takes a ring structure, includes an N-substituted lactam group, a cyclic iminoether group, a cyclic imine group, an N-substituted hydrogenated cyclic iminoether group, a cyclic ether group, an N-substituted cyclic imide group or combinations thereof, and when it does not take a ring structure, includes an N-substituted non-cyclic imide group, a non-cyclic tertiary amide group and the like. Accordingly, a non-cyclic ether or a non-cyclic ester which is an oxygen atom taking no ring structure, and further, a non-cyclic thiol or a non-cyclic thioester which is a sulfur atom taking no ring structure are not suitable as the hydrogen-accepting functional group of the component (B). Preferable is a group having both of a nitrogen atom and an oxygen atom, when the hydrogen-accepting functional group takes a ring structure, preferable is an N-substituted lactam group, or a cyclic iminoether group, and when the hydrogen-accepting functional group takes no ring structure, preferable is an N-substituted non-cyclic imide group or a non-cyclic tertiary amide group. The hydrogen-accepting functional group further preferably is a heterocyclic group taking a ring structure, in which there is a carbonyl group at an a position of a nitrogen atom, and is specifically an N-substituted lactam group such a pyrrolidone group, an N-substituted cyclic imide group or a cyclic tertiary amide group.

The component (B) of the present invention is a polymer having the hydrogen-accepting functional group as described above, and is obtained by polymerizing an unsaturated monomer having a hydrogen-accepting functional group, or copolymerizing an unsaturated monomer having a hydrogen-accepting functional group and another copolymerizable monomer.

Examples of the unsaturated monomer having an N-substituted lactam group include N-vinylpyrrolidone, N-vinylcaprolactam, N-vinyl-4-methylpyrrolidone, N-vinyl-4-ethylpyrrolidone, N-vinyl-4-propylpyrrolidone, N-vinyl-4-butylpyrrolidone, N-vinyl-4-methyl-5-ethylpyrrolidone, N-vinyl-4-methyl-5-propylpyrrolidone, N-vinyl-5-methyl-5-ethylpyrrolidone, N-vinyl-5-propylpyrrolidone, N-vinyl-5-butylpyrrolidone, N-vinyl-4-methylcaprolactam, N-vinyl-6-methylcaprolactam, N-vinyl-6-propylcaprolactam, N-vinyl-7-butylcaprolactam, and the like.

Examples of the unsaturated monomer having a cyclic iminoether group include 2-vinyl-2-oxazoline, 5-methyl-2-vinyl-2-oxazoline, 4,4-dimethyl-2-vinyl-2-oxazoline, 4,4-dimethyl-2-isopropenyl-2-oxazoline, 4-acryloyl-oxymethyl-2,4-dimethyl-2-oxazoline, 4-methacryloyl-oxymethyl-2,4-dimethyl-2-oxazoline, 4-methacryloyl-oxymethyl-2-phenyl-4-methyl-2-oxazoline, 2-(4-vinylphenyl)-4,4-dimethyl-2-oxazoline, 4-ethyl-4-carboethoxymethyl-2-isopropenyl-2-oxazoline, 2-vinyl-5,6-dihydro-4H-1,3-oxazine, 2-isopropenyl-5,6-dihydro-4H-1,3-oxazine, and the like.

Examples of the unsaturated monomer having a cyclic imine include 2-vinylpyridine, 4-vinylpyridine, and the like.

Examples of the unsaturated monomer having an N-substituted hydrogenated cyclic iminoether group include N-vinylmorpholine, N-(meth)acryloylmorpholine, and the like.

Examples of the unsaturated monomer having a cyclic ether include tetrahydrofurfuryl acrylate, 2-vinyl-1,4-dioxane, (5-ethyl-1,3-dioxane-5-yl)methyl acrylate, and the like.

Examples of the unsaturated monomer having an N-substituted cyclic imide group include N-vinylmaleinimide, N-(4-vinylphenyl)maleinimide, N-vinylphthalimide, and the like.

Examples of the unsaturated monomer having an N-substituted non-cyclic imide group include N-vinyldiacetamide, N-vinyldibenzamide, N-vinyl-N-acetylbenzamide, N-acetyl-N-(3-vinylpropanoyl)benzamide, N-acetyl-N-3-(meth)acryloylpropanoylbenzamide, N,N-di(2-furoyl)vinylamine, and the like.

Examples of the unsaturated monomer having a non-cyclic tertiary amide group include N,N-dimethylacrylamide, N,N-diethylacrylamide, N,N-diisopropylacrylamide, N-methyl-N-isopropylacrylamide, and the like.

A vinyl polymer having a hydrogen-accepting functional group can be produced by the same method as that of a vinyl polymer having a hydrogen-donating functional group of the component (A). A molecular weight of the film-forming polymer (B) is usually 1,000 to 2,000,000, preferably 2,000 to 1,500,000, and more preferably 3,000 to 1,000,000 as expressed by a number average molecular weight. When a number average molecular weight is smaller than 1,000, improvement in solvent resistance becomes not to be sufficiently obtained, and when a number average molecular weight is greater than 2,000,000, the viscosity becomes extremely great, and preparation and coating of the paint become difficult.

Component (C)

A component (C) of the low-temperature-curable coating composition of the present invention is a non-basic volatile solvent selected from the group consisting of a non-basic volatile solvent (C-1) having, in the molecule, both a heteroatom that bonds covalently to a hydrogen atom and a heteroatom that does not bond covalently to a hydrogen atom, a mixture of a non-basic volatile solvent (C-2) having, in the molecule, a heteroatom which bonds covalently to a hydrogen atom and a non-basic volatile solvent (C-3) having, in the molecule, a heteroatom to which no hydrogen atom bonds covalently, and combinations thereof. The heteroatom is usually an oxygen atom (O), a nitrogen atom (N), and a sulfur atom (S), and is classified into a heteroatom in which it is bonded to a hydrogen atom and a heteroatom in which it is not bonded to a hydrogen atom, as stated above. Provided that this non-basic volatile solvent (C) must be non-basic, and the heteroatom is mainly an oxygen atom (O) or a sulfur atom (S). The component (C) is a non-basic volatile solvent, and volatility is required such that when expressed by a relative evaporation rate at 20° C. letting an evaporation rate of n-butyl acetate to be 100, a relative evaporation rate is 0.1 or more, preferably 0.2 or more, and more preferably 0.3 or more.

The non-basic volatile solvent (C-1) used in the present invention has, in the molecule, both a heteroatom that bonds covalently to a hydrogen atom and a heteroatom that does not bond covalently to a hydrogen atom, and examples thereof include, for example, an alkoxy alcohol having both of a hydroxy group and an ether group (also referred to as cellosolve, in the case of a monoether compound of ethylene glycol), specifically, methoxypropanol, ethoxypropanol, propoxypropanol, butoxypropanol, methoxyethanol, ethoxyethanol, propoxypropanol, butoxyethanol, SOLFIT, dipropylene glycol monomethyl ether, ethyldiglycol or butyldiglycol.

The non-basic volatile solvent (C-1) is preferably methoxypropanol, ethoxypropanol, propoxypropanol, ethoxyethanol, propoxypropanol, butoxyethanol or dipropylene glycol monomethyl ether, and more preferably methoxypropanol, propoxypropanol, or butoxyethanol.

The non-basic volatile solvent (C-2) has, in the molecule, a heteroatom which bonds covalently to a hydrogen atom, the non-basic volatile solvent (C-3) has, in the molecule, a heteroatom to which no hydrogen atom bonds covalently, and a mixture of two kinds of the solvents is used as the component (C) in the present invention. The heteroatom in this case is also an oxygen atom (O) or a sulfur atom (S). Volatility in the non-basic volatile solvents (C-2) and (C-3) can be also represented by a relative value when the evaporation rate of N-butyl acetate is expressed to be 100 as mentioned above, and it is necessary that the relative evaporation rate is 0.1 or more, preferably 0.2 or more, and more preferably 0.3 or more, like the basic volatile solvent (C-1).

The non-basic volatile solvent (C-2) used in the present invention, in the case of oxygen, is an alcohol satisfying the above-mentioned volatility, and examples thereof include specifically an alkyl alcohol (e.g. methanol, ethanol, propanol, n-butanol, iso-butanol, t-butanol, pentanol, 2-ethylhexanol), a cyclic alcohol (e.g. cyclohexanol) and the like. In the case of sulfur, examples thereof include n-propanethiol, iso-propanethiol, n-butanethiol, iso-butanethiol, t-butanethiol, hexanethiol, benzylmercaptan, and the like.

The non-basic volatile solvent (C-3), in the case of oxygen, is an ether satisfying the above-mentioned volatility, and examples thereof include specifically a dialkyl ether (e.g. diethyl ether, dipropyl ether, diisopropyl ether or dibutyl ether), a dialkyl ether of a diol (e.g. dimethyl glycol, dimethyl diglycol, methylethyl diglycol, diethyl diglycol or dibutyl diglycol), a cyclic ether (e.g. tetrahydrofuran or dioxane), a compound having an ether group and an ester group in a molecule (e.g. propylene glycol monomethyl ether acetate, diethylene glycol monoethyl ether acetate, diethylene glycol monobutyl ether acetate or ethyl 3-ethoxypropionate) and the like. In the case of sulfur, dialkyl sulfide (e.g. dimethyl sulfide, diethyl sulfide, dipropyl sulfide or dipropyl disulfide), cyclic sulfide (e.g. thiophene, tetrahydrothiophene) and the like can be used.

A second kind of the component (C) is a mixture of the non-basic volatile solvents (C-2) and (C-3) as described above, and as the non-basic volatile solvent (C-2), ethanol, iso-propanol, n-butanol, iso-butanol, t-butanol, and 2-ethylhexanol are particularly preferable, and as the volatile non-basic low molecular weight solvent (C-3), dioxane, tetrahydrofuran, dimethyl glycol, and dimethyl diglycol are particularly preferable.

Blending Amounts of Components (A) to (C)

Blending amounts of the film-forming polymer (A) and the film-forming polymer (B) are 1:100 to 100:1, preferably 1:50 to 50:1, and more preferably 1:30 to 30:1, as expressed by the weight ratio of the component (A):the component (B). When the component (A) is more than 100:1, there is a defect that only solvent resistance approximately to the same extent as that of the component (A) is obtained, and when the component (A) is smaller than 1:100, there is a defect that only solvent resistance approximately to the same extent as that of the component (B) is obtained.

The ratio of the components (A) and (B) can also be expressed by the molar ratio of functional groups, and the molar ratio of the hydrogen-donating functional group:the hydrogen-accepting functional group is usually 1:100 to 100:1, preferably 1:50 to 50:1, and more preferably 1:30 to 30:1. When a molar amount of the hydrogen-donating functional group is more than 100:1, there is a defect that only solvent resistance approximately to the same extent as that of the component (A) is obtained, and when a molar amount of the hydrogen-donating functional group is smaller than 1:100, there is a defect that only solvent resistance approximately to the same extent as that of the component (B) is obtained.

The component (C) basically has both functions of a solvent, and a capping agent of the hydrogen-donating functional group, and is not particularly limited as far as an amount thereof is such an amount that the component (A) and the component (B) are dissolved, and an amount thereof is usually 10 to 99% by weight, preferably 20 to 95% by weight, and more preferably 25 to 90% by weight of a total amount of the components (A) to (C). The component (C) may be more than 99% by weight, but volatilization needs the time and this is wasteful. Conversely, when the component (C) is smaller than 10% by weight, solubility and the capping function of the hydrogen-donating functional group become not sufficient, an unnecessary reaction between the hydrogen-donating functional group and the hydrogen-accepting functional group is generated, and solidification or increase in the viscosity is generated.

Component (D)

The low-temperature-curable coating composition of the present invention may comprise a film-forming polymer (D) having both of a hydrogen-donating functional group having a heteroatom which bonds covalently to a hydrogen atom and a hydrogen-accepting functional group having a heteroatom to which no hydrogen atom bonds covalently, having both functions, in which the hydrogen-accepting functional group may or may not have a ring structure, when the hydrogen-accepting functional group has a ring structure, the heteroatom is a nitrogen atom, an oxygen atom and/or a sulfur atom, and when the hydrogen-accepting functional group has no ring structure, the heteroatom consists of only a nitrogen atom, or both of a nitrogen atom and an oxygen atom, in place of the film-forming polymers (A) and (B). Additionally, the film-forming polymer (D) may exist together with one or both of the film-forming polymer (A) or (B).

As the hydrogen-donating functional group having a heteroatom which bonds covalently to a hydrogen atom in the film-forming polymer (D), the same hydrogen-donating functional group as that of the above-mentioned component (A) can be used, and as the hydrogen-accepting functional group having a heteroatom to which no hydrogen atom bonds covalently, the same hydrogen-accepting functional group as that of the above-mentioned component (B) can be used. Provided that the hydrogen-accepting functional group is a functional group which may or may not have a ring structure, when the functional group has a ring structure, the heteroatom is a nitrogen atom, an oxygen atom and/or a sulfur atom, and when the functional group has no ring structure, the heteroatom consists of only a nitrogen atom, or both of a nitrogen atom and an oxygen atom.

Accordingly, the film-forming polymer (D) may be obtained by copolymerizing the unsaturated monomer having a hydrogen-donating functional group, the unsaturated monomer having a hydrogen-accepting functional group, and optionally, another copolymerizable monomer. Alternatively, the film-forming polymer (D) can be produced by a polymer reaction between a (co)polymer having a hydrogen-donating functional group and a (co)polymer having a hydrogen-donating functional group, sequential radical polymerization between a (co)polymer segment having a hydrogen-donating functional group and a (co)polymer segment having a hydrogen-donating functional group or the like. In any case, a reaction can be performed at the condition under which a hydrogen-accepting functional group and a hydrogen-donating functional group do not cause a reaction, or by performing treatment that such a reaction is not caused. Of course, a method for producing the film-forming polymer (D) is not limited to them.

A molecular weight of the film-forming polymer (D) is usually 1,000 to 3,000,000, preferably 2,000 to 2,000,000, and more preferably 3,000 to 1,500,000 as expressed by a number average molecular weight. When a number average molecular weight is smaller than 1,000, improvement in solvent resistance becomes not to be sufficiently obtained, and when a number average molecular weight is greater than 3,000,000, there is a defect that the viscosity becomes extremely great, preparation or coating of the paint become difficult.

The molar ratio of the hydrogen-donating functional group:the hydrogen-accepting functional group in the film-forming polymer (D) is usually 1:100 to 100:1, preferably 1:50 to 50:1, and more preferably 1:30 to 30:1. When a molar amount of the hydrogen-donating functional group is more than 100:1, only solvent resistance approximately to the same extent as that of the case where the hydrogen-accepting functional group is not used is obtained, and when a molar amount of the hydrogen-donating functional group is smaller than 1:100, there is a defect that only solvent resistance approximately to the same extent as that of the case where the hydrogen-donating functional group is not used is obtained.

As described above, the film-forming polymer of the component (D) can also be used by further combining with the component (A) or the component (B). The molar ratio of the hydrogen-donating functional group:the hydrogen-accepting functional group when the component (D) is used by combining with the component (A) and the component (B) is usually 1:100 to 100:1, preferably 1:50 to 50:1, and more preferably 1:30 to 30:1. When a molar amount of the hydrogen-donating functional group is more than 100:1, there is a defect that only solvent resistance approximately to the same extent as that of when the film-forming component having the hydrogen-accepting functional group is not used is obtained, and when a molar weight of the hydrogen-donating functional group is smaller than 1:100, there is a defect that only solvent resistance approximately to the same extent as that of the case where the film-forming component having the hydrogen-donating functional group is not used is obtained.

Also when the component (D) is used, the component (C) basically has both functions of a solvent, and a capping agent of the hydrogen-donating functional group. An amount of the component (C) is not particularly limited, as far as it is such an amount that the component (D) is dissolved, but the component (C) is usually 10 to 99% by weight, preferably 20 to 95% by weight, and more preferably 25 to 90% by weight of a total amount of the component (D) and the component (C). The component (C) may be more than 99% by weight, but volatilization needs the time, and this is wasteful. Conversely, when the component (C) is smaller than 10% by weight, solubility and the capping function of the hydrogen-donating functional group become not sufficient, an unnecessary reaction between the hydrogen-donating functional group and the hydrogen-accepting functional group is generated, and solidification or increase in the viscosity is generated. Also when the component (D) is combined with the component (A) or the component (B), the component (C) is 10 to 99% by weight, preferably 20 to 95% by weight, and more preferably 25 to 90% by weight of an amount of a whole composition.

The low-temperature-curable coating composition in the present invention may comprise a solvent other than the component (C), for example, such as heptane, toluene, and xylene, in addition to the components (A) to (D).

Other Components of Low-Temperature-Curable Coating Composition

The low-temperature-curable coating composition in the present invention may comprise optional other components, in addition to the components (A) to (D). Examples of other components include a pigment, a design material (sand, silica sand, color sand, beads, color chip, mineral chip, glass chip, woody chip and color beads), a film formation aid, a surface adjusting agent, an antiseptic, a fungicide, an antifoaming agent, a light stabilizer, an ultraviolet absorbing agent, an antioxidant, a pH adjusting agent and the like.

The pigment is not particularly limited, but examples thereof include, for example, organic coloring pigments such as an azo chelate-based pigment, an insoluble azo-based pigment, a condensed azo-based pigment, a monoazo-based pigment, a bisazo-based pigment, a diketopyrrolopyrrole-based pigment, a benzimidazolone-based pigment, a phthalocyanine-based pigment, an indigo-based pigment, a thioindigo-based pigment, a perinone-based pigment, a perylene-based pigment, a dioxane-based pigment, a quinacridone-based pigment, an isoindolinone-based pigment, a naphthol-based pigment, a pyrazolone-based pigment, an anthraquinone-based pigment, an anthrapyrimidine-based pigment, and a metal complex pigment; inorganic coloring pigments such as chrome yellow, yellow iron oxide, chromium oxide, molybdate orange, red iron oxide, titanium yellow, zinc white, carbon black, titanium dioxide, cobalt green, phthalocyanine green, ultramarine blue, cobalt blue, phthalocyanine blue, and cobalt violet; mica pigments (titanium dioxide-covered mica, colored mica, metal-plated mica), graphite pigments, alumina flake pigments, metal titanium flake, stainless flake, plate-like iron oxide, phthalocyanine flake, metal-plated glass flake, other coloring or colored flat pigments; extender pigments such as titanium oxide, calcium carbonate, barium sulfate, barium carbonate, magnesium silicate, clay, talc, silica, and fired kaolin.

When the low-temperature-curable coating composition of the present invention comprises a pigment, it is preferable that the pigment mass concentration (PWC) to a solid content of a paint composition is in a range of 5 to 70% by mass. When the PWC is less than 5% by mass, performance to hide an underlying substrate is inferior, and when the PWC exceeds 70% by mass, there is a possibility that weather resistance is deteriorated. The pigment mass concentration (PWC) is more preferably 20 to 45% by mass.

A method for preparing the low-temperature-curable coating composition of the present invention is not particularly limited, but the low-temperature-curable coating composition can be prepared by stirring the above-mentioned respective components with a stirrer or the like. When the pigment or the design material is contained in the low-temperature-curable coating composition, the pigment or the design material having good dispersibility can be mixed with a stirrer, and as another method, dispersion which is obtained by dispersing the pigment or the design material in a resin for dispersing a pigment using a sand grind mill in advance can also be added.

Coating Method etc.

The low-temperature-curable coating composition of the present invention can be prepared into a film having high solvent resistance by heating to a predetermined temperature after coated on a surface of a material to be coated, such as a metal surface. Coating of such low-temperature-curable coating composition can be performed by a normal method such as immersion, brush coating, spraying, and a roll coater. Additionally, the heating condition after coating may be the heating condition under which the non-basic volatile solvent (C) is volatilized, and a hydrogen bond is formed, and is usually a few tens of minutes at 50 to 100° C. to a few days at 15° C. Of course, the coating condition is not limited to them.

EXAMPLES

The present invention will be illustrated in more detail by way of Examples. In Examples, unless otherwise indicated, part and % denote parts by weight and % by weight.

Synthesis of Film-Forming Polymer A-I Having Hydrogen-Donating Functional Group

A 2 liter reactor vessel equipped with a stirrer, a temperature regulator, and a condenser was charged with 500 parts of methoxypropanol, a monomer solution consisting of 150 parts of acrylic acid, 180 parts of styrene, 80 parts of n-butyl acrylate, and 180 parts of n-butyl methacrylate, and an initiator solution consisting of 60 parts of methoxypropanol and 12 parts of t-amyl peroxyoctoate were added thereto dropwise at 115° C. for 3 hours, and stirring was further continued for 1 hour. Then, an initiator solution consisting of 10 parts of methoxypropanol and 2 parts of t-amyl peroxyoctoate was added dropwise at 115° C. for 30 minutes, and stirring was further continued for 30 minutes, thereby, an acryl varnish having the Gardner bubble viscosity of X, a solid content acid value of 200 mgKOH/g and a solid content of 50% by weight was obtained. A number average molecular weight of this acrylic resin was measured using "HLC8220GPC" (product name, manufactured by TOSOH CORPORATION) as a GPC apparatus, and two of "Shodex KF-606M" and "Shodex KF-603" (both manufactured by SHOWA DENKO K.K., product name) as a column under the conditions of a mobile phase: tetrahydrofuran, a measurement temperature: 40° C., a flow rate: 0.6 cc/min, and a detector: RI, and as a result, a number average molecular weight was 14,000.

Synthesis of Film-Forming Polymer A-II Having Hydrogen-Donating Functional Group According to the same manner as that of the film-forming polymer A-I except that 75 parts of acrylic acid, 175 parts of styrene, 40 parts of n-butyl acrylate, and 300 parts of n-butyl methacrylate were used as a monomer solution, an acrylic varnish having the Gardner bubble viscosity of U and a solid content acid value of 100 mgKOH/g was obtained. A number average molecular weight was 14,000.

Synthesis of Film-Forming Polymer A-III Having Hydrogen-Donating Functional Group According to the same manner as that of the film-forming polymer A-I except that 15 parts of acrylic acid, 180 parts of styrene, 10 parts of n-butyl acrylate, and 390 parts of n-butyl methacrylate were used as a monomer solution, an acrylic varnish having the Gardner bubble viscosity of S and a solid content acid value of 20 mgKOH/g was obtained. A number average molecular weight was 14,000.

Film-Forming Polymer A-IV Having Hydrogen-Donating Functional Group

S-LEC BL-1 (butyral resin) commercially available from SEKISUI CHEMICAL CO., LTD. is used. S-LEC BL-1 is a butyral resin having a calculated molecular weight of about 19,000 and a butyralization degree of about 63.

Film-Forming Polymer A-V Having Hydrogen-Donating Functional Group

SN THICKENER-N-1 (polycarboxylic acid) commercially available from SAN NOPCO LIMITED is used. SN THICKENER-N-1 is an aqueous polycarboxylic acid resin solution having a pH of about 1.8, the viscosity of about 15,000 mPa·s, and a resin solid content of about 25%.

Synthesis of Film-Forming Polymer A-VI Having Hydrogen-Donating Functional Group According to the same manner as that of the film-forming polymer A-I except that the organic solvent used in synthesis was changed from methoxypropanol to methyl isobutyl ketone, an acrylic varnish having the Gardner bubble viscosity of X and a number average molecular weight of 15,000 was obtained.

Film-Forming Polymer B-I Having Hydrogen-Accepting Functional Group

Sokalan K30P commercially available from BASF Japan Ltd. is used. Sokalan K30P is polyvinylpyrrolidone having a molecular weight of 45,000.

Film-Forming Polymer B-II Having Hydrogen-Accepting Functional Group

Sokalan VA64P commercially available from BASF Japan Ltd. is used. Sokalan VA64P is a 64/40 copolymer of vinylpyrrolidone and vinyl acetate.

Synthesis of Film-Forming Polymer B-III Having Hydrogen-Accepting Functional Group According to the same manner as that of the film-forming polymer A-I except that 220 parts of 2-vinylpyridine, 180 parts of styrene, 150 parts of n-butyl acrylate, and 20 parts of n-butyl methacrylate were used as a monomer solution, a polymerization solution was obtained, thereafter, the solution was dried under reduced pressure with an evaporator while heating at 60° C. to obtain a polymer solid content, and the polymer solid content was diluted with methoxypropanol, thereby, a vinylpyridine-copolymerized varnish having a solid content of 25% and a solid content pyridine value of 200 mgKOH/g was obtained. A number average molecular weight measured with a GPC apparatus using "Shodex KF-806M" (product name, manufactured by SHOWA DENKO K.K.) as a column, and dimethylformamide (DMF) with 10 mM LiBr added thereto as a mobile phase was 8,000.

Film-Forming Polymer B-IV Having Hydrogen-Accepting Functional Group

EPOCROS WS-500 commercially available from NIPPON SHOKUBAI CO., LTD. is used. EPOCROS WS-500 is an oxazoline group-containing polymer having a number average molecular weight of 20,000.

Synthesis of Film-Forming Polymer D-I Having Hydrogen-Donating Functional Group and Accepting Functional Group According to the same manner as that of the film-forming polymer A-I except that 235 parts of N-vinylpyrrolidone, 105 parts of acrylic acid, 75 parts of n-butyl acrylate, and 175 parts of n-butyl methacrylate were used as a monomer solution, an acrylic varnish having the Gardner bubble viscosity of Z2 and a solid content acid value of 135 mgKOH/g was obtained. A number average molecular weight measured with a GPC apparatus using "Shodex KF-806M" (product name, manufactured by SHOWA DENKO K.K.) as a column, and using DMF with 10 mM LiBr added thereto as a mobile phase was 16,000.

Synthesis of Film-Forming Polymer D-II Having Hydrogen-Donating Functional Group and Accepting Functional Group According to the same manner as that of the film-forming polymer A-I except that 235 parts of N-vinylpyrrolidone, 190 parts of 2-hydroxyethyl methacrylate, 75 parts of n-butyl acrylate, and 90 parts of n-butyl methacrylate were used as a monomer solution, an acrylic varnish having the Gardner bubble viscosity of Z1 and a solid content hydroxy value of 140 mgKOH/g was obtained. A number average molecular weight measured with a GPC apparatus using "Shodex KF-806M" (product name, manufactured by SHOWA DENKO K.K.) as a column, and using DMF with 10 mM LiBr added thereto as a mobile phase was 23,000.

Film-Forming Polymer X-I Having Non-Cyclic Ether Group (for Comparative Example)

NEWPOL LB-1715 commercially available from Sanyo Chemical Industries, Ltd. is used. NEWPOL LB-1715 is polyoxypropylene alkyl ether having a number average molecular weight of 2,390.

Synthesis of Film-Forming Polymer X-II Having Non-Cyclic Ester Group (for Comparative Example)

According to the same manner as that of the film-forming polymer A-I except that 190 parts of styrene, 10 parts of n-butyl acrylate, and 390 parts of n-butyl methacrylate were used as a monomer solution, an acrylic varnish having the Gardner bubble viscosity of R and a solid content acid value of 0 mgKOH/g was obtained. A number average molecular weight was 14,000.

Example 1

Thirty parts by weight of the film-forming polymer (A-I) was mixed into 70 parts by weight of methoxypropanol (MP) to prepare a film-forming polymer (A-I) varnish. Then, 15 parts by weight of Sokalan K30P (solid content 100%) which is the film-forming polymer (B-I), and 85 parts by weight of methoxypropanol (MP) were mixed to prepare a film-forming polymer (B-I) varnish. Both were mixed to prepare a composite varnish.

Mixability

Mixability of the resulting composite varnish is shown in Table 1. Table 1 also describes formulation of the composite varnish, the non-volatile content (NV) concentration (% by weight) of the composite varnish and the weight ratio of the film-forming polymer (A-I) and the film-forming polymer (B-I). Mixability was evaluated based on the following criteria.

Evaluation x . . . When mixed, the precipitate such as a gel mass is formed.

○ . . . Even when mixed, the precipitate is not formed.

Water Droplet Spot Whitening Property

In order to detect a component which may remarkably reduce water resistance performance of a coated film when it remains in the coated film, a water droplet spot whitening property test of the resulting coated film was performed as stated below.

Water Droplet Spot Whitening Property Test

The above-mentioned composite varnish was coated on a tinned plate having the size of 150 mm×150 mm with a bar coater, and dried at 60° C. for 30 minutes. One droplet of deionized water was placed on the resulting coated film with a 2 ml plastic dropper, and allowed to stand for 5 seconds, water droplets were absorbed with a waste cloth without rubbing the coated film, and whether whitening is seen on the coated film or not was evaluated. Results are shown in Table 1.

Evaluation

○ . . . There was no clear whitening.

x . . . A coated film was remarkably whitened.

Solvent Resistance

Then, concerning the coated film which had been obtained by the above-mentioned procedure, solvent resistance to methyl isobutyl ketone (MIBK), methyl ethyl ketone (MEK), methoxypropanol (MP), isopropanol (IPA), ethanol (EtOH) and deionized water (DIW) was tested by the following method. Results are shown in Table 1.

Separately, the varnish (A-I) or the varnish (B-I) was coated on a tinned plate with a bar coater, and dried at 60° C. for 30 minutes, like the composite varnish. Also regarding a coated film of this sole varnish, a solvent resistance test was performed like the composite varnish of the present invention. This sole varnish was subjected to the solvent resistance test for comparison in order to show superiority of the composite varnish of Examples. Results are shown in Table 1.

Solvent Resistance Test

A process of placing one droplet of each chemical on a coated film with a 2 ml plastic dropper, rubbing this reciprocally 20 times with a fingertip wearing a latex glove, and wiping this with a waste cloth is defined as one cycle, and the cycle number until the coated film is dissolved is described as evaluation.

Evaluation

1 . . . A coated film was completely dissolved in 1 cycle.

2 . . . A coated film was completely dissolved in 2 cycles.

3 . . . A coated film remained even in a third cycle.

As a result of the solvent resistance test, whether the composite sample is more excellent than evaluation of a sole sample or not was classified as follows. Results are shown in Table 1.

◎ . . . The case where evaluation of solvent resistance of a composite sample is higher than both sole samples.

○ . . . The case where evaluation of solvent resistance of a composite sample is higher than either one of them.

– . . . The case where evaluation of solvent resistance of a composite sample has the same score as that of both sole samples.

x . . . The case where evaluation of solvent resistance of a composite sample is inferior to either one of them.

Comprehensive Evaluation

As a result of the solvent resistance test, whether a composite sample is comprehensively superior to a sole sample or not was classified as follows. Results are shown in Table 1.

◎ . . . The case where evaluation of solvent resistance of a composite sample is any of "◎", "○" or "–", and includes "◎".

○ . . . The case where evaluation of solvent resistance of a composite sample is any of "○" or "–", and includes "○".

x . . . The case where evaluation of solvent resistance of a composite sample includes any one of "×".

Examples 2 to 16

A combination of the film-forming polymer A and a solvent thereof described in Tables 1 to 6 is expressed by A varnish (specifically, A-I varnish to A-V varnish), a combination of the film-forming polymer B and a solvent thereof is expressed by B varnish (specifically, B-I varnish to B-IV varnish), and a mixture of both of them is expressed by composite varnish, and the non-volatile matter content % (NV %) of the composite varnish and the A/B ratio by weight are similarly described in Tables. Regarding each varnish, mixability, water droplet spot whitening property, a solvent resistance test and comprehensive evaluation were performed as in Example 1. Results are described in each Example of Tables 1 to 6. In Examples 8 to 13, the molar ratio of the hydrogen-donating functional group and the hydrogen-accepting functional group of the film-forming polymers A and B is also described in Tables. Additionally, in Examples 14 to 16, an example of the case where, as the film-forming polymer, the film-forming polymer D having both of the hydrogen-donating functional group and the hydrogen-accepting functional group (specifically, film-forming polymers D-I and D-II) is used is shown, Example 14 is formulation of the film-forming polymer D-I alone, and Examples 15 and 16 are an example of a combination of the film-forming polymer D-I or D-II and the film-forming polymer A-I. The A varnish and the B varnish used as comparison in solvent resistance of Table 6 are the A-I varnish and the B-II varnish of Example 8 in Example 14, and are also the A-I varnish and the B-II varnish of Example 8 in Examples 15 and 16 like Example 14.

Example 17

This Example is Example in which curability at low temperatures (e.g. room temperature) is investigated. Thirty parts by weight of the film-forming polymer (A-I) was mixed into 70 parts by weight of methoxypropanol (MP) to prepare a film-forming polymer (A-I) varnish. Then, 15 parts by weight of Sokalan VA64P (solid content 100%) which is the film-forming polymer (B-II) and 85 parts by weight of methoxypropanol (MP) were mixed to prepare a film-forming polymer (B-II) varnish. Both were mixed to prepare a composite varnish.

A 15% by weight solution of each film-forming polymer A or B alone as the paint was similarly coated on a tinned plate with a bar coater, and dried at room temperature for 5 days. An air conditioner was not used during drying, and maximum room temperature was 15° C. Also concerning a coated film of this sole varnish, the solvent resistance test was performed like the composite varnish of the present invention. This sole varnish was subjected to the test for the purpose of reference for showing superiority of the composite varnish of Examples. Results are shown in Table 7.

Examples 18 to 22

Examples 18 and 19 are an example in which a solvent of the component C to be used was changed, and Examples 20 and 21 are an example in which a solvent of the component C to be used was changed, and at the same time, another solvent (toluene or toluene and methyl ethyl ketone (MEK)) was added. In Example 21, A-VI was used as the film-forming polymer A. In Example 22, as another solvent, heptane was added to each of varnishes of Example 18. Mixability, water droplet spot whitening property, solvent resistance and comprehensive evaluation were performed as in Example 1. Results are shown in Tables 8 and 9. In Tables 8 and 9, tetrahydrofuran was expressed by THF, dimethyl diglycol was expressed by DMDG, and n-butanol was expressed by nBuOH.

Comparative Examples 1 and 2

Each of the film-forming polymers A-VI (methyl isobutyl ketone (MIBK) solution) and B-II used in Examples was mixed using a solvent which is not a solvent of the component C, specifically, methyl ethyl ketone (MEK) and acetylacetone to prepare an A-VI varnish and a B-II varnish, thereafter, both were mixed at the weight ratio of 1:1, and mixability was confirmed. Results are shown in Table 10. In Comparative Examples 1 and 2, mixability was inferior, and a water droplet spot whitening property test and a solvent resistance test in which a film is formed were not performed.

Comparative Example 3

The film-forming polymer A-VI (methyl isobutyl ketone solution) used in Examples was mixed using a solvent which is not a solvent of the component C, specifically, a mixed solution of N,N-dimethylethanolamine (DMEA) and deionized water to prepare an A-VI varnish. Then, the film-forming polymer B-I used in Examples was mixed using a solvent which is not a solvent of the component C, specifically, deionized water to prepare a B-I varnish. Both were mixed at the weight ratio of 1:1, a mixability test and a water droplet spot whitening property test were performed, and the similar evaluation was performed, as in Example 1. Results are shown in Table 11, in Comparative Example 3, water droplet spot whitening property was inferior, and a solvent resistance test was not performed.

Comparative Examples 4 and 5

The film-forming polymer A-I used in Examples was mixed with a solvent of the component C, specifically, methoxypropanol to prepare an A-I varnish. Then, a polymer which is not a polymer of the component B, specifically, the film-forming polymer X-I and the film-forming polymer X-II were mixed with a solvent of the component C, specifically, methoxypropanol, respectively, to prepare an X-I varnish and an X-II varnish. The A-I varnish was mixed with the X-I varnish and the X-II varnish, respectively, at the weight ratio of 1:1, and as in Example 1, a mixability test of each varnish, and a water droplet spot whitening property test and a solvent resistance test of a coated film were performed, and similar evaluation was performed. Results are described in each Comparative Example of Table 12.

TABLE 1

| | | | Example 1 | | | | Example 2 | | | | Example 3 | | | |
|---|---|---|---|---|---|---|---|---|---|---|---|---|---|---|
| | | | Raw material | Solid content % | Solvent species | Parts by weight | Raw material | Solid content % | Solvent species | Parts by weight | Raw material | Solid content % | Solvent species | Parts by weight |
| Formulation design | Film-forming polymer A | Resin component | A-I | 50 | MP | 30 | A-I | 50 | MP | 30 | A-I | 50 | MP | 30 |
| | Solvent for film-forming polymer A | Component C (Solvent with capping function) | MP | — | — | 70 | MP | — | — | 70 | MP<br>Dioxane<br>EtOH | — | — | 20<br>25<br>25 |
| | Film-forming polymer B | Resin component | B-I | 100 | — | 15 | B-II | 100 | — | 15 | B-IV | 39 | DIW/MP | 38.5 |
| | Solvent for film-forming polymer B | Component C (Solvent with capping function) | MP | — | — | 85 | MP | — | — | 85 | MP<br>Dioxane<br>EtOH | — | — | 11.5<br>25<br>25 |
| | Composite varnish NV [%] | | | | 15 | | | | 15 | | | | 15 | |
| | A/B ratio by weight | | | | 1/1 | | | | 1/1 | | | | 1/1 | |
| Mixability | | | | | ○ | | | | ○ | | | | ○ | |
| Water droplet spot whitening property | | | | | ○ | | | | ○ | | | | ○ | |
| | | | A-I varnish | B-I varnish | Composite varnish | Improvement due to compositing | A-I varnish | B-II varnish | Composite varnish | Improvement due to compositing | A-I varnish | B-IV varnish | Composite varnish | Improvement due to compositing |
| Solvent resistance | MIBK | | 2 | 2 | 3 | ⊙ | 2 | 3 | 3 | ○ | 2 | 3 | 3 | ○ |
| | MEK | | 1 | 1 | 3 | ⊙ | 1 | 1 | 3 | ⊙ | 1 | 3 | 3 | ○ |
| | MP | | 1 | 1 | 3 | ⊙ | 1 | 1 | 3 | ⊙ | 1 | 3 | 3 | ○ |
| | IPA | | 2 | 1 | 2 | ○ | 2 | 1 | 2 | ○ | 2 | 3 | 3 | ○ |
| | EtOH | | 1 | 1 | 2 | ⊙ | 1 | 1 | 2 | ⊙ | 1 | 2 | 3 | ⊙ |
| | DIW | | 2 | 2 | 3 | ○ | 3 | 1 | 3 | ○ | 3 | 2 | 3 | ○ |
| | Comprehensive evaluation of composite sample | | | | ⊙ | | | | ⊙ | | | | ⊙ | |

TABLE 2

| | | | Example 4 | | | | Example 5 | | | | Example 6 | | | |
|---|---|---|---|---|---|---|---|---|---|---|---|---|---|---|
| | | | Raw material | Solid content % | Solvent species | Parts by weight | Raw material | Solid content % | Solvent species | Parts by weight | Raw material | Solid content % | Solvent species | Parts by weight |
| Formulation design | Film-forming polymer A | Resin component | A-V | 25 | DIW | 60 | A-I | 50 | MP | 30 | A-I | 50 | MP | 30 |
| | Solvent for film-forming polymer A | Component C (Solvent with capping function) | Dioxane<br>EtOH | — | — | 20<br>20 | MP | — | — | 70 | MP | — | — | 20 |
| | Film-forming polymer B | Resin component | B-I | 100 | — | 15 | B-III | 25 | — | 60 | B-II | 100 | — | 15 |
| | Solvent for film-forming polymer B | Component C (Solvent with capping function) | DIW<br>Dioxane<br>EtOH | — | — | 35<br>25<br>25 | MP | — | — | 40 | MP | — | — | 35 |
| | Composite varnish NV [%] | | | | 15 | | | | 15 | | | | 30 | |
| | A/B ratio by weight | | | | 1/1 | | | | 1/1 | | | | 1/1 | |
| Mixability | | | | | ○ | | | | ○ | | | | ○ | |
| Water droplet spot whitening property | | | | | ○ | | | | ○ | | | | ○ | |
| | | | A-V varnish | B-I varnish | Composite varnish | Improvement due to compositing | A-I varnish | B-III varnish | Composite varnish | Improvement due to compositing | A-I varnish | B-IV varnish | Composite varnish | Improvement due to compositing |
| Solvent resistance | MIBK | | 3 | 2 | 3 | ○ | 2 | 1 | 3 | ⊙ | 2 | 3 | 3 | ○ |
| | MEK | | 2 | 1 | 3 | ⊙ | 1 | 1 | 1 | — | 1 | 1 | 3 | ⊙ |
| | MP | | 2 | 1 | 3 | ○ | 1 | 1 | 2 | ⊙ | 1 | 1 | 3 | ⊙ |
| | IPA | | 3 | 1 | 3 | ○ | 2 | 1 | 3 | ⊙ | 2 | 1 | 2 | ○ |
| | EtOH | | 3 | 1 | 3 | ○ | 1 | 1 | 1 | — | 1 | 1 | 2 | ⊙ |
| | DIW | | 2 | 2 | 2 | — | 3 | 3 | 3 | — | 3 | 1 | 3 | ○ |
| | Comprehensive evaluation of composite sample | | | | ⊙ | | | | ⊙ | | | | ⊙ | |

TABLE 3

| | | | Example 7 | | | |
|---|---|---|---|---|---|---|
| | | | Raw material | Solid content % | Solvent species | Parts by weight |
| Formulation design | Film-forming polymer A | Resin component | A-IV | 100 | — | 15 |
| | Solvent for film-forming polymer A | Component C (Solvent with capping function) | MP | | — | 85 |
| | Film-forming polymer B | Resin component | B-II | 100 | — | 15 |
| | Solvent for film-forming polymer B | Component C (Solvent with capping function) | MP | | — | 85 |
| | Composite varnish NV [%] | | 15 | | | |
| | A/B ratio by weight | | 1/1 | | | |
| Mixability | | | ○ | | | |
| Water droplet spot whitening property | | | ○ | | | |

| | | A-IV varnish | B-II varnish | Composite varnish | Improvement due to compositing |
|---|---|---|---|---|---|
| Solvent resistance | MIBK | 2 | 3 | 3 | ○ |
| | MEK | 2 | 1 | 2 | ○ |
| | MP | 2 | 1 | 2 | ○ |
| | IPA | 2 | 1 | 2 | ○ |
| | EtOH | 2 | 1 | 2 | ○ |
| | DIW | 3 | 1 | 3 | ○ |
| | Comprehensive evaluation of composite sample | ○ | | | |

TABLE 4

| | | | Example 8 | | | | Example 9 | | | | Example 10 | | | |
|---|---|---|---|---|---|---|---|---|---|---|---|---|---|---|
| | | | Raw material | Solid content % | Solvent species | Parts by weight | Raw material | Solid content % | Solvent species | Parts by weight | Raw material | Solid content % | Solvent species | Parts by weight |
| Formulation design | Film-forming polymer A | Resin component | A-I | 50 | MP | 30 | A-I | 50 | MP | 36 | A-I | 50 | MP | 40 |
| | Solvent for film-forming polymer A | Component C (Solvent with capping function) | MP | — | — | 70 | MP | — | — | 84 | MP | — | — | 93 |
| | Film-forming polymer B | Resin component | B-II | 100 | — | 15 | B-II | 100 | — | 12 | B-II | 100 | — | 10 |
| | Solvent for film-forming polymer B | Component C (Solvent with capping function) | MP | — | — | 85 | MP | — | — | 68 | MP | — | — | 57 |
| | Composite varnish NV [%] | | | | 15 | | | | 15 | | | | 15 | |
| | A/B ratio by weight | | | | 1/1 | | | | 1.5/1 | | | | 2/1 | |
| | A/B functiional group molar ratio | | | | 0.66/1 | | | | 1/1 | | | | 1.33/1 | |
| Mixability | | | | | ○ | | | | ○ | | | | ○ | |
| Water droplet spot whitening property | | | | | ○ | | | | ○ | | | | ○ | |
| | | | A-I varnish | B-I varnish | Composite varnish | Improvement due to compositing | A-I varnish | B-II varnish | Composite varnish | Improvement due to compositing | A-I varnish | B-II varnish | Composite varnish | Improvement due to compositing |
| Solvent resistance | MIBK | | 2 | 3 | 3 | ○ | 2 | 3 | 3 | ○ | 2 | 3 | 3 | ○ |
| | MEK | | 1 | 1 | 3 | ⊙ | 1 | 1 | 3 | ⊙ | 1 | 1 | 1 | — |
| | MP | | 1 | 1 | 3 | ⊙ | 1 | 1 | 2 | ⊙ | 1 | 1 | 3 | ⊙ |
| | IPA | | 2 | 1 | 2 | ○ | 2 | 1 | 3 | ⊙ | 2 | 1 | 3 | ⊙ |
| | EtOH | | 1 | 1 | 2 | ⊙ | 1 | 1 | 2 | ⊙ | 1 | 1 | 1 | ⊙ |
| | DIW | | 3 | 1 | 3 | ○ | 3 | 1 | 3 | ○ | 3 | 1 | 3 | ○ |
| | Comprehensive evaluation of composite sample | | | | ⊙ | | | | ⊙ | | | | ⊙ | |

TABLE 5

| | | | Example 11 | | | | Example 12 | | | | Example 13 | | | |
|---|---|---|---|---|---|---|---|---|---|---|---|---|---|---|
| | | | Raw material | Solid content % | Solvent species | Parts by weight | Raw material | Solid content % | Solvent species | Parts by weight | Raw material | Solid content % | Solvent species | Parts by weight |
| Formulation design | Film-forming polymer A | Resin component | A-II | 50 | MP | 30 | A-III | 50 | MP | 30 | A-III | 50 | MP | 58 |
| | Solvent for film-forming polymer A | Component C (Solvent with capping function) | MP | — | — | 70 | MP | — | — | 70 | MP | — | — | 135.3 |
| | Film-forming polymer B | Resin component | B-II | 100 | — | 15 | B-II | 100 | — | 15 | B-II | 100 | — | 1 |
| | Solvent for film-forming polymer B | Component C (Solvent with capping function) | MP | — | — | 85 | MP | — | — | 85 | MP | — | — | 5.7 |
| | Composite varnish NV [%] | | | | 15 | | | | 15 | | | | 15 | |
| | A/B ratio by weight | | | | 1/1 | | | | 1/1 | | | | 29/1 | |
| | A/B functional group molar ratio | | | | 0.33/1 | | | | 0.07/1 | | | | 1.93/1 | |
| Mixability | | | | | ○ | | | | ○ | | | | ○ | |
| Water droplet spot whitening property | | | | | ○ | | | | ○ | | | | ○ | |
| | | | A-I varnish | B-I varnish | Composite varnish | Improvement due to compositing | A-I varnish | B-II varnish | Composite varnish | Improvement due to compositing | A-I varnish | B-II varnish | Composite varnish | Improvement due to compositing |
| Solvent resistance | MIBK | | 2 | 3 | 3 | ○ | 2 | 3 | 3 | ○ | 2 | 3 | 3 | ○ |
| | MEK | | 1 | 1 | 2 | ⊙ | 1 | 1 | 1 | — | 1 | 1 | 2 | ⊙ |
| | MP | | 1 | 1 | 2 | ⊙ | 1 | 1 | 2 | ⊙ | 1 | 1 | 2 | ⊙ |
| | IPA | | 2 | 1 | 3 | ⊙ | 2 | 1 | 2 | ○ | 2 | 1 | 2 | ○ |
| | EtOH | | 1 | 1 | 2 | ⊙ | 1 | 1 | 1 | — | 1 | 1 | 1 | — |
| | DIW | | 3 | 1 | 3 | ○ | 3 | 1 | 3 | ○ | 3 | 1 | 3 | ○ |
| | Comprehensive evaluation of composite sample | | | | ⊙ | | | | ⊙ | | | | ⊙ | |

TABLE 6

| | | | Example 14 | | | | Example 15 | | | | Example 16 | | | |
|---|---|---|---|---|---|---|---|---|---|---|---|---|---|---|
| | | | Raw material | Solid content % | Solvent species | Parts by weight | Raw material | Solid content % | Solvent species | Parts by weight | Raw material | Solid content % | Solvent species | Parts by weight |
| Formulation design | Film-forming polymer A | Resin component | — | — | — | — | A-I | 50 | MP | 30 | A-I | 50 | MP | 30 |
| | Solvent for film-forming polymer A | Component C (Solvent with capping function) | — | — | — | — | MP | — | — | 70 | MP | — | — | 70 |
| | Film-forming polymer B | Resin component | — | — | — | — | — | — | — | — | — | — | — | — |
| | Solvent for film-forming polymer B | Component C (Solvent with capping function) | — | — | — | — | — | — | — | — | — | — | — | — |
| | Film-forming polymer D | Resin component | D-I | 50 | MP | 30 | D-I | 50 | MP | 30 | D-II | 50 | MP | 30 |
| | | Component C (Solvent with capping function) | MP | — | — | 70 | MP | — | — | 70 | MP | — | — | 70 |
| | Composite varnish NV [%] | | | | 15 | | | | 15 | | | | 15 | |
| | A/B functional group molar ratio | | | | 1/0.67 | | | | 1.67/1 | | | | 1.7/1 | |
| Mixability | | | | | ○ | | | | ○ | | | | ○ | |
| Water droplet spot whitening property | | | | | ○ | | | | ○ | | | | ○ | |
| | | | A-I varnish | B-I varnish | D-I varnish | Improvement due to compositing | A-I varnish | B-II varnish | Composite varnish | Improvement due to compositing | A-I varnish | B-IV varnish | Composite varnish | Improvement due to compositing |
| Solvent resistance | MIBK | | 2 | 3 | 3 | ○ | 2 | 3 | 3 | ○ | 2 | 3 | 3 | ○ |
| | MEK | | 1 | 1 | 2 | ⊙ | 1 | 1 | 2 | ⊙ | 1 | 1 | 2 | ⊙ |
| | MP | | 1 | 1 | 2 | ⊙ | 1 | 1 | 2 | ⊙ | 1 | 1 | 2 | ⊙ |
| | IPA | | 2 | 1 | 2 | ○ | 2 | 1 | 2 | ○ | 2 | 1 | 3 | ⊙ |
| | EtOH | | 1 | 1 | 1 | — | 1 | 1 | 1 | — | 1 | 1 | 2 | ⊙ |
| | DIW | | 3 | 1 | 3 | ○ | 3 | 1 | 3 | ○ | 3 | 1 | 3 | ○ |
| | Comprehensive evaluation of composite sample | | | | ⊙ | | | | ⊙ | | | | ⊙ | |

TABLE 7

| | | | Example 17 | | | |
|---|---|---|---|---|---|---|
| | | | Raw material | Solid content % | Solvent species | Parts by weight |
| Formulation design | Film-forming polymer A | Resin component | A-I | 50 | MP | 30 |
| | Solvent for film-forming polymer A | Component C (Solvent with capping function) | MP | — | — | 70 |
| | Film-forming polymer B | Resin component | B-II | 100 | — | 15 |
| | Solvent for film-forming polymer B | Component C (Solvent with capping function) | MP | — | — | 85 |
| | Composite varnish NV [%] | | | | 15 | |
| | A/B ratio by weight | | | | 1/1 | |
| Mixability | | | | | ○ | |
| Water droplet spot whitening property | | | | | ○ | |

| | | A-I varnish | B-II varnish | Composite varnish | Improvement due to compositing |
|---|---|---|---|---|---|
| Solvent resistance | MIBK | 2 | 1 | 3 | ○ |
| | MEK | 1 | 1 | 3 | ⊙ |
| | MP | 1 | 1 | 3 | ⊙ |
| | IPA | 2 | 1 | 2 | ○ |
| | EtOH | 1 | 1 | 2 | ⊙ |
| | DIW | 3 | 12 | 3 | ○ |
| | Comprehensive evaluation of composite sample | | | ⊙ | |

TABLE 8

| | | | Example 18 | | | | Example 19 | | | | Example 20 | | | |
|---|---|---|---|---|---|---|---|---|---|---|---|---|---|---|
| | | | Raw material | Solid content % | Solvent species | Parts by weight | Raw material | Solid content % | Solvent species | Parts by weight | Raw material | Solid content % | Solvent species | Parts by weight |
| Formulation design | Film-forming polymer A | Resin component | A-I | 50 | MP | 35.4 | A-I | 50 | MP | 35.4 | A-I | 50 | MP | 35.4 |
| | Solvent for film-forming polymer A | Component C (Solvent with capping function) | EtOH<br>THF | — | — | 35<br>47.3 | DMDG<br>nBuOH | — | — | 41.15<br>41.15 | THF | — | — | 20 |
| | Other Solvent | | — | — | — | — | — | — | — | — | Toluene | — | — | 62.3 |
| | Film-forming polymer B | Resin component | B-II | 100 | — | 15 | B-II | 100 | — | 17.7 | B-II | 100 | — | 15 |
| | Solvent for film-forming polymer B | Component C (Solvent with capping function) | MP<br>EtOH<br>THF | — | — | 17.7<br>35<br>47.3 | MP<br>DMDG<br>nBuOH | <br>— | <br>— | 17.7<br>41.15<br>41.15 | MP<br>THF | — | — | 17.7<br>20 |
| | Other solvent | | — | — | — | — | — | — | — | — | Toluene | — | — | 62.3 |
| | Composite varnish NV [%] | | | | 15 | | | | 15 | | | | 15 | |
| | A/B ratio by weight | | | | 1/1 | | | | 1/1 | | | | 1/1 | |
| Mixability | | | | | ○ | | | | ○ | | | | ○ | |
| Water droplet spot whitening property | | | | | ○ | | | | ○ | | | | ○ | |
| | | | A-I varnish | B-II varnish | Composite varnish | Improvement due to compositing | A-I varnish | B-II varnish | Composite varnish | Improvement due to compositing | A-I varnish | B-II varnish | Composite varnish | Improvement due to compositing |
| Solvent resistance | MIBK | | 2 | 3 | 3 | ○ | 2 | 3 | 3 | ○ | 2 | 3 | 3 | ○ |
| | MEK | | 1 | 1 | 3 | ⊙ | 1 | 1 | 3 | ⊙ | 1 | 1 | 3 | ⊙ |
| | MP | | 1 | 1 | 3 | ⊙ | 1 | 1 | 3 | ⊙ | 1 | 1 | 3 | ⊙ |
| | IPA | | 2 | 1 | 2 | ○ | 2 | 1 | 2 | ○ | 2 | 1 | 2 | ○ |
| | EtOH | | 1 | 1 | 2 | ⊙ | 1 | 1 | 2 | ⊙ | 1 | 1 | 2 | ⊙ |
| | DIW | | 3 | 1 | 3 | ○ | 3 | 1 | 3 | ○ | 3 | 1 | 3 | ○ |
| | Comprehensive evaluation of composite sample | | | | ⊙ | | | | ⊙ | | | | ⊙ | |

TABLE 9

| | | | Example 21 | | | | Example 22 | | | |
|---|---|---|---|---|---|---|---|---|---|---|
| | | | Raw material | Solid content % | Solvent species | Parts by weight | Raw material | Solid content % | Solvent species | Parts by weight |
| Formulation design | Film-forming polymer A | Resin component | A-VI | 50 | MIBK | 35.4 | A-I | 50 | MP | 35.4 |
| | Solvent for film-forming polymer A | Component C (Solvent with capping function) | EtOH<br>THF | — | — | 20<br>37.3 | EtOH<br>THF | — | — | 22.3<br>45 |
| | Other Solvent | | Toluene | — | — | 15 | Heptane | — | — | 15 |
| | Film-forming polymer B | Resin component | B-II | 100 | — | 15 | B-II | 100 | — | 15 |
| | Solvent for film-forming polymer B | Component C (Solvent with capping function) | EtOH<br>THF | — | — | 20<br>37.3 | MP<br>EtOH<br>THF | — | — | 17.7<br>22.3<br>45 |
| | Other Solvent | | MEK<br>Toluene | — | — | 17.7<br>15 | Heptane | — | — | 15 |
| | Composite varnish NV [%] | | | 15 | | | | 15 | | |
| | A/B ratio by weight | | | 1/1 | | | | 1/1 | | |
| Mixability | | | | ○ | | | | ○ | | |
| Water droplet spot whitening property | | | | ○ | | | | ○ | | |
| | | | A-VI varnish | B-II varnish | Composite varnish | Improvement due to compositing | A-I varnish | B-II varnish | Composite varnish | Improvement due to compositing |
| Solvent resistance | MIBK | | 2 | 3 | 3 | ○ | 2 | 3 | 3 | ○ |
| | MEK | | 1 | 1 | 3 | ⊙ | 1 | 1 | 3 | ⊙ |
| | MP | | 1 | 1 | 3 | ⊙ | 1 | 1 | 3 | ⊙ |
| | IPA | | 2 | 1 | 2 | ○ | 2 | 1 | 2 | ○ |
| | EtOH | | 1 | 1 | 2 | ⊙ | 1 | 1 | 2 | ⊙ |
| | DIW | | 3 | 1 | 3 | ○ | 3 | 1 | 3 | ○ |
| | Comprehensive evaluation of composite sample | | | ⊙ | | | | ⊙ | | |

TABLE 10

| | | | Comparative Example 1 | | | | Comparative Example 2 | | | |
|---|---|---|---|---|---|---|---|---|---|---|
| | | | Raw material | Solid content % | Solvent species | Parts by weight | Raw material | Solid content % | Solvent species | Parts by weight |
| Formulation design | Film-forming polymer A | Resin component | A-VI | 50 | MIBK | 35.4 | A-VI | 50 | MIBK | 35.4 |
| | Other solvent | | MEK | — | — | 82.3 | Acetylacetone | — | — | 82.3 |
| | Film-forming polymer B | Resin component | B-II | 100 | — | 17.7 | B-II | 100 | — | 17.7 |
| | Other solvent | | MEK | — | — | 100 | Acetylacetone | — | — | 100 |
| | Composite varnish NV [%] | | | 15 | | | | 15 | | |
| | A/B ratio by weight | | | 1/1 | | | | 1/1 | | |
| Mixability | | | | x | | | | x | | |

TABLE 11

| | | | Comparative Example 3 | | | |
|---|---|---|---|---|---|---|
| | | | Raw material | Solid content % | Solvent species | Parts by weight |
| Formulation design | Film-forming polymer A | Resin component | A-VI | 50 | MIBK | 30 |
| | Solvent for film-forming polymer A | Component C (Solvent with capping function) | — | — | — | — |
| | Other solvent | | DMEA<br>DIW | — | — | 1.8<br>68.2 |
| | Film-forming polymer B | Resin component | B-I | 100 | — | 15 |
| | Solvent for film-forming polymer B | Component C (Solvent with capping function) | — | — | — | — |
| | Other solvent | | DIW | — | — | 85 |
| | Composite varnish NV [%] | | | 15 | | |
| | A/B ratio by weight | | | 1/1 | | |
| Mixability | | | | ○ | | |
| Water droplet spot whitening property | | | | x | | |

TABLE 12

| | | | Comparative Example 4 | | | | Comparative Example 5 | | | |
|---|---|---|---|---|---|---|---|---|---|---|
| | | | Raw material | Solid content % | Solvent species | Parts by weight | Raw material | Solid content % | Solvent species | Parts by weight |
| Formulation design | Film-forming polymer A | Resin component | A-I | 50 | MP | 30 | A-I | 50 | MP | 30 |
| | Solvent for film-forming polymer A | Component C (Solvent with capping function) | MP | — | — | 70 | MP | — | — | 70 |
| | Other solvent | | — | — | — | — | — | — | — | — |
| | Film-forming polymer B | Resin component | X-I | 100 | — | 15 | X-II | 50 | MP | 30 |
| | Solvent for film-forming polymer B | Component C (Solvent with capping function) | MP | — | — | 85 | MP | — | — | 70 |
| | Other solvent | | — | — | — | — | — | — | — | — |
| | Composite varnish NV [%] | | | 15 | | | | 15 | | |
| | A/B ratio by weight | | | 1/1 | | | | 1/1 | | |
| Mixability | | | | ○ | | | | ○ | | |
| Water droplet spot whitening property | | | | ○ | | | | ○ | | |

| | | A-I varnish | X-I varnish | Composite varnish | Improvement due to compositing | A-I varnish | X-II varnish | Composite varnish | Improvement due to compositing |
|---|---|---|---|---|---|---|---|---|---|
| Solvent resistance | MIBK | 2 | 1 | 1 | x | 2 | 1 | 1 | x |
| | MEK | 1 | 1 | 1 | — | 1 | 1 | 1 | — |
| | MP | 1 | 1 | 1 | — | 1 | 1 | 1 | — |
| | IPA | 2 | 1 | 1 | x | 2 | 1 | 1 | x |
| | EtOH | 1 | 1 | 1 | — | 1 | 1 | 1 | — |
| | DIW | 3 | 1 | 2 | x | 3 | 1 | 2 | x |
| | Comprehensive evaluation of composite sample | | | x | | | | x | |

As apparent from the above Examples and Comparative Examples, in Examples, solvent resistance is higher in the composite varnish than in the sole varnish in all examples, and the coated film having high solvent resistance is formed even at low temperature curing. Particularly, Example 17 shows an example in which curing was performed at a temperature of 15° C. or lower, and a high solvent resistant film is also obtained. In Comparative Examples 1 and 2, an experiment is performed using a solvent which is not the component C of the present invention, but mixing itself of the film-forming polymer A and the film-forming polymer B could not be performed. Comparative Example 3 is an example in which a solvent used in JP H06-322292 A of the prior art document, N,N-dimethylethanolamine was used, mixability is good, but when water droplets were spot-added to a coated film surface, the coated film generated whitening. Comparative Examples 4 and 5 are an example in which as the film-forming polymer B, an oxygen-containing polymer having a straight chain as the hydrogen-accepting functional group (specifically, non-cyclic ether and non-cyclic ester) was used, and in these Comparative Examples 4 and 5, mixability and water droplet spot whitening property are not inferior to Examples, but it is seen that solvent resistance is very inferior, and the varnishes cannot be used.

INDUSTRIAL APPLICABILITY

Since the low-temperature-curable coating composition of the present invention cures at low temperatures (15 to 100° C., 15° C. or lower in some cases) to form a coated film having high solvent resistance, the composition can be widely utilized in the fields of paints and protective films.

The invention claimed is:

1. A low-temperature-curable coating composition which comprises (A) a film-forming polymer having a hydrogen-donating functional group that has a heteroatom which bonds covalently to a hydrogen atom, (B) a film-forming polymer having a hydrogen-accepting functional group that has a heteroatom to which no hydrogen atom bonds covalently, wherein the hydrogen-accepting functional group may or may not have a ring structure, when the hydrogen-accepting functional group has a ring structure, the heteroatom is a nitrogen atom, an oxygen atom and/or a sulfur atom, and when the hydrogen-accepting functional group has no ring structure, the heteroatom consists of only a nitrogen atom, or both of a nitrogen atom and an oxygen atom, and (C) a non-basic volatile solvent selected from the group consisting of a non-basic volatile solvent (C-1) having, in the molecule, both a heteroatom that bonds covalently to a hydrogen atom and a heteroatom that does not bond covalently to a hydrogen atom; a mixture of a non-basic volatile solvent (C-2) having, in the molecule, a heteroatom which bonds covalently to a hydrogen atom and a non-basic volatile solvent (C-3) having, in the molecule, a heteroatom to which no hydrogen atom bonds covalently; and combinations thereof.

2. The low-temperature-curable coating composition according to claim 1, wherein the hydrogen-donating functional group is a group having an oxygen atom which bonds covalently to a hydrogen atom.

3. The low-temperature-curable coating composition according to claim 2, wherein the hydrogen-donating functional group is a carboxy group and/or a hydroxy group.

4. The low-temperature-curable coating composition according to claim 1, wherein the hydrogen-accepting functional group has a ring structure, and is selected from the group consisting of an N-substituted lactam group, a cyclic iminoether group, a cyclic imine group, an N-substituted hydrogenated cyclic iminoether group, a cyclic ether group, an N-substituted cyclic imide group and combinations thereof.

5. The low-temperature-curable coating composition according to claim 4, wherein the hydrogen accepting-functional group is an N-substituted lactam group and/or a cyclic imine group.

6. The low-temperature-curable coating composition according to claim 1, wherein the hydrogen-accepting functional group has no ring structure, and is an N-substituted non-cyclic imide group and/or a non-cyclic tertiary amide group.

7. The low-temperature-curable coating composition according to claim 1, wherein the non-basic volatile solvent (C-1) is a low molecular weight ether alcohol having an ether group and a hydroxy group.

8. The low-temperature-curable coating composition according to claim 1, wherein the non-basic volatile solvent (C-2) is a low molecular weight alcohol, and the non-basic volatile solvent (C-3) is a low molecular weight ether.

9. A low-temperature-curable coating composition which comprises:

(D) a film-forming polymer having both of a hydrogen-donating functional group that has a heteroatom which bonds covalently to a hydrogen atom and a hydrogen-accepting functional group that has a heteroatom to which no hydrogen atom bonds covalently to a hydrogen atom, wherein the hydrogen-accepting functional group may or may not have a ring structure, when the hydrogen-accepting functional group has a ring structure, the heteroatom is a nitrogen atom, an oxygen atom and/or a sulfur atom, and when the hydrogen-accepting functional group has no ring structure, the heteroatom consists of only a nitrogen atom, or both of a nitrogen atom and an oxygen atom, and (C) a non-basic volatile solvent selected from the group consisting of a non-basic volatile solvent (C-1) having, in the molecule, both a heteroatom that bonds covalently to a hydrogen atom and a heteroatom that does not bond covalently to a hydrogen atom; a mixture of a non-basic volatile solvent (C-2) having, in the molecule, a heteroatom which bonds covalently to a hydrogen atom and a non-basic volatile solvent (C-3) having, in the molecule, a heteroatom to which no hydrogen atom bonds covalently; and combinations thereof.

10. The low-temperature-curable coating composition according to claim 9, wherein the low-temperature-curable coating composition further contains (A) a film-forming polymer having a hydrogen-donating functional group that has a heteroatom which bonds covalently to a hydrogen atom, or (B) a film-forming polymer having a hydrogen-accepting functional group that has a heteroatom to which no hydrogen atom bonds covalently, wherein the hydrogen-accepting functional group may or may not have a ring structure, when the hydrogen-accepting functional group has a ring structure, the heteroatom is a nitrogen atom, an oxygen atom and/or a sulfur atom, and when the hydrogen-accepting functional group has no ring structure, the heteroatom consists of only a nitrogen atom, or both of a nitrogen atom and an oxygen atom.

11. The low-temperature-curable coating composition according to claim 9, wherein the hydrogen-donating functional group is a group having an oxygen atom which bonds covalently to a hydrogen atom.

12. The low-temperature-curable coating composition according to claim 11, wherein the hydrogen-donating functional group is a carboxy group and/or a hydroxy group.

13. The low-temperature-curable coating composition according to claim 9, wherein the hydrogen-accepting functional group has a ring structure, and is selected from the group consisting of an N-substituted lactam group, a cyclic iminoether group, a cyclic imine group, an N-substituted hydrogenated cyclic iminoether group, a cyclic ether group, an N-substituted cyclic imide group and combinations thereof.

14. The low-temperature-curable coating composition according to claim 13, wherein the hydrogen-accepting functional group is an N-substituted lactam group and/or a cyclic imine group.

15. The low-temperature-curable coating composition according to claim 9, wherein the hydrogen-accepting functional group has no ring structure, and is an N-substituted non-cyclic imide group and/or a non-cyclic tertiary amide group.

16. The low-temperature-curable coating composition according to claim 9, wherein the film-forming polymer (D) is a polymer having a carboxy group and/or a hydroxy group, and an N-substituted lactam group and/or a cyclic imine group.

17. The low-temperature-curable coating composition according to claim 10, wherein the film-forming polymer (A) is a polymer having a carboxy group and/or a hydroxy group.

18. The low-temperature-curable coating composition according to claim 10, wherein the film-forming polymer (B) is a polymer having an N-substituted lactam group and/or a cyclic imine group.

19. The low-temperature-curable coating composition according to claim 9, wherein the non-basic volatile solvent (C-1) is a low molecular weight ether alcohol having an ether group and a hydroxy group.

20. The low-temperature-curable coating composition according to claim 9, wherein the non-basic volatile solvent (C-2) is a low molecular weight alcohol, and the non-basic volatile solvent (C-3) is a low molecular weight ether.

* * * * *